United States Patent [19]
Trotman et al.

[11] 4,328,993
[45] * May 11, 1982

[54] BODY SUPPORTING AND SPACING STRUCTURE

[76] Inventors: Helen H. Trotman; Herbert H. Trotman, both of P.O. Box 807, Virginia Beach, Va. 23451

[*] Notice: The portion of the term of this patent subsequent to Jun. 3, 1997, has been disclaimed.

[21] Appl. No.: 121,169

[22] Filed: Feb. 13, 1980

Related U.S. Application Data

[63] Continuation-in-part of Ser. No. 16,401, Mar. 1, 1979, Pat. No. 4,205,880, which is a continuation-in-part of Ser. No. 909,761, May 26, 1978, abandoned, which is a continuation of Ser. No. 783,263, Mar. 31, 1977, abandoned.

[51] Int. Cl.³ .............................................. A47C 7/02
[52] U.S. Cl. ....................................... 297/453; 5/468
[58] Field of Search ................... 297/453; 5/468, 481, 5/461

[56] References Cited

U.S. PATENT DOCUMENTS

| | | | |
|---|---|---|---|
| 2,948,333 | 8/1960 | Goldstein | 5/461 |
| 3,050,749 | 8/1962 | Crane et al. | 5/461 |
| 3,162,487 | 12/1964 | Trotman | 297/453 |
| 3,167,353 | 1/1965 | Crane | 297/453 |
| 3,940,183 | 2/1976 | Seltzer et al. | 297/453 |
| 4,143,916 | 3/1979 | Trotman et al. | 297/453 |
| 4,205,880 | 6/1980 | Trotman et al. | 297/453 |

Primary Examiner—Francis K. Zugel
Attorney, Agent, or Firm—Shanley, O'Neil and Baker

[57] ABSTRACT

A body support member for spacing a body above a supporting structure which comprises a sheet of resilient plastic material permanently deformed to produce downwardly disposed, laterally spaced, elongated protuberances distributed over a body support area for engaging the supporting surface, adjacent elongated protuberances being complementary in shape with each one having a plurality of reversed direction portions along its length, the reversed direction portions in adjacent protuberances being in overlapping relation in the plane of the body support area looking in the direction the elongated protuberances extend, whereby the body support area of the member will resist flexing along all straight lines traversing the body support area. The body support area is surrounded by a marginal portion including a raised bead and in the instant form of the invention the elongated protuberances stop short of the bead to present a marginal ledge or narrow shelf which can be utilized to hold a flat, decorative cover sheet by sewing or the like to the ledge. In such case the cover sheet resides in recessed relation to the bead with no portion of the plastic sheet material overlying the decorative cover, thereby enhancing the overall appearance of the covered body support member while reducing its cost. In a modification the decorative cover overlies and holds a cushion pad in place.

12 Claims, 9 Drawing Figures

BODY SUPPORTING AND SPACING STRUCTURE

RELATED APPLICATIONS

This application is a continuation in part of application Ser. No. 16,401, filed Mar. 1, 1979, now U.S. Pat. No. 4,205,880, which in turn was a continuation in part of application Ser. No. 909,761, filed May 26, 1978, now abandoned, which last named application was a continuation of application Ser. No. 783,263, filed Mar. 31, 1977, now abandoned.

BACKGROUND OF THE INVENTION

For some time, it has been desirable to have available for various uses, including in ventilated seat covers, an economical single sheet member formed from resilient plastic which will support a body in spaced relation to a supporting structure where the member is formed from a single sheet of plastic which is permanently deformed to produce spacing elements or protuberances which not only will space the upper surface of the member above the supporting structure but will resiliently rigidify the overall member to prevent excessive flexing or any undesirable amount of flexing in use.

In U.S. Pat. Nos. 3,162,487 and 3,162,488 of H. H. Trotman, a single sheet of plastic is deformed to produce spacing elements of protuberances in a ventilated seat cushion. In these patents, however, the sheet of plastic, although adequately preforming the spacing function as part of the seat construction, requires additional stiffening members in order to assure that the seat will retain its shape.

U.S. Pat. No. 2,948,334 of Goldstein is another example of a prior art attempt to produce a ventilated seat cushion from a sheet of plastic where the resulting product lacks the necessary combination of rigidity and resilience for a successful product.

In U.S. Pat. No. 3,940,183, a support panel for use as a ventilated body support mat is disclosed having a plurality of integral T-shaped elements arrayed in columns and rows in an attempt to attain the desired combination of rigidity and resilience. Here again the desideratum is not attained as is evidenced by the provision of supplemental stiffening means.

By an ingenious interrelationship of elongated protuberances formed by permanent deformation of a sheet of plastic material, the present invention supplies the deficiences of the prior art. By using a sheet of plastic material which, when shaped in accordance with the present invention is resilient in the realm of the forces exerted by the weight of a human body, the formed sheet of plastic material of the present invention can be used as a member which is rigid enough to retain its shape while at the same time exhibiting a springy characteristic so as to act as a cushion between a human body and a supporting structure. This is especially the case where the sheet of plastic material is superposed on a cushion such as an automobile seat cushion to achieve ventilation between the person supported on the sheet of plastic material and the automobile seat.

Although from the foregoing and as description of the present invention proceeds, it will be apparent that the body support member of the present invention is applicable to fields other than seat cushions, the invention will be described in the seat cushion environment where the resilience of the thin sheet of plastic material, taken in conjunction with the configuration of the sheet, can be utilized to great advantage.

SUMMARY OF THE INVENTION

A supporting spacing member for use between a supporting surface and a body to be supported comprising a sheet of resilient plastic material having an upper surface and a lower surface, a body support area provided by the sheet of plastic material, the sheet of plastic material including a raised bead surrounding the body support area, a plurality of spaced elongated protuberances permanently formed in the sheet of plastic material throughout the body support area and extending downwardly from the upper surface, the elongated protuberances being open at the top and having side walls and bottom walls, the plurality of elongated protuberances being disposed in spaced adjacent relation to one another and extending from end to end longitudinally continuously along paths each of which extend across a dimension of the body support area which is slightly less than an entire dimension of the body support area, thereby forming a ledge in the sheet of plastic material extending around the body support area between the raised bead and the ends of the elongated protuberances, portions of the sheet of plastic material which extend between the open tops of spaced adjacent elongated protuberances coacting to form in the aggregate a generally flat body engaging structure, the lowermost surfaces of the bottom walls of protuberances coating to form in the aggregate a generally flat support structure for engaging the supporting surface, each of the plurality of elongated protuberances incorporating along its length a plurality of curved direction changing portions and a plurality of portions connecting the curved direction changing portions, successive curved direction changing portions of elongated protuberances alternating in the direction of change along the paths across the body support area, alternate curved direction changing portions of spaced adjacent elongated protuberances along the paths across the body support area being in overlapping relation to each other looking in the direction the paths extend, the disposition of elongated protuberances in paths across said dimension of the body support area and the overlapping relationship of the alternate curved direction changing portions resulting in a body support area in which all planes normal to the generally flat body engaging structure will successively intersect a plurality of elongated protuberances at a plurality of spaced points across said dimension of the body support area or will repeatedly intersect alternately disposed portions connecting curved direction changing portions of a single elongated protuberance at a plurality of spaced points across said dimension of the body support area.

DESCRIPTION OF THE PREFERRED EMBODIMENTS

Figure 1:
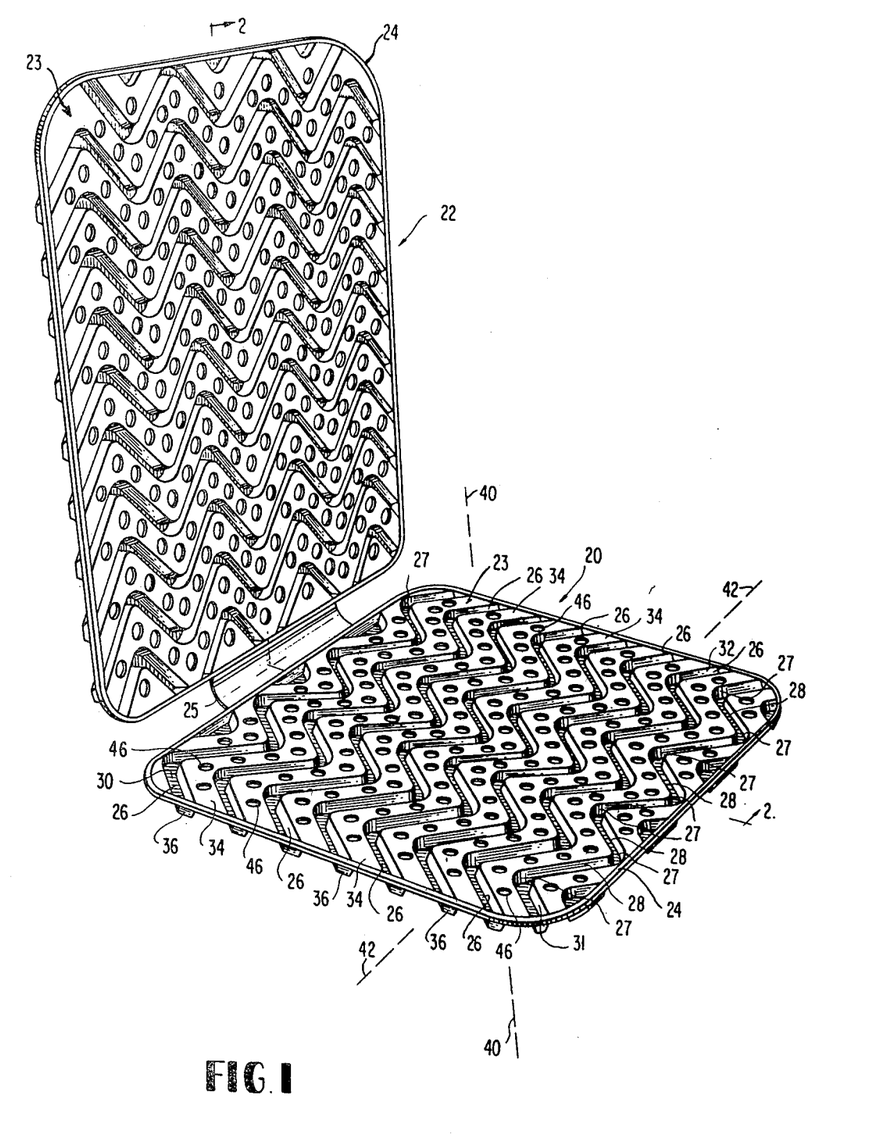
FIG. 1 is a perspective view of the basic component disclosed in the parent application which is suitable for conversion into the seat cushion of the present invention for use in an automobile where a ventilated seat with an improved ornamental cover sheet or pad is desired.

As already mentioned, the principles and advantages of the present invention will be described in the environment of a car seat and a preferred form of the same is shown in FIGS. 2 to 5, taken in conjunction with the showing of FIG. 1. FIG. 1 is the basic component of a car seat cushion as disclosed in the parent application Ser. No. 16,401, now U.S. Pat. No.4,205,880, and as will be evident as this description proceeds, this basic component is modified as shown in FIGS. 2 to 5 to form the car seat cushion of the present invention.

The basic component of the car seat cushion of the present invention is made up of a seat member indicated generally by the reference numeral 20 and a back member indicated generally by the reference numeral 22, each member having an ornamental bead or marginal portion 24 circumscribing a body support area indicated generally at 23, 23. Normally the seat member and the back member will be formed integrally from the same material, namely, a thin sheet of resilient plastic which can be heat formed in a vacuum or pressure mold to give a desired permanent, three dimensional configuration to the sheet. An integral hinge section 25 joins the seat and back portions.

Since the body support areas 23, 23 can have the same configuration in the seat member and the back member and are so shown in FIG. 1, specific reference is made at this point only to the seat member.

In the presently preferred embodiment of the present invention, a plurality of elongated protuberances 26 are formed in a flat sheet of plastic material in a vacuum mold in the inverse position of seat member 20 as shown in FIG. 1 so that as the sheet is formed in the mold, the protuberances are directed upwardly. However, for convenience in describing the present invention and without limitation in respect to what is top and what is bottom in the various modifications shown, described and covered by the appended claims, the surface of the seat member which appears uppermost in FIGS. 1, 2, 4 and 5 will be termed the top surface of the sheet and the opposite side of the sheet will be termed the bottom surface. Thus, in the seat member of these figures, the elongated protuberances 26 depend downwardly and are open upwardly.

In view of the nature of the plastic sheet and the method of manufacture of the seat and back member it will be seen that the basic component of the car seat cushion as modified in FIGS. 2 to 5 is nestable and therefore stackable for storage and shipment. This can constitute a tremendous commercial advantage where the basic component is shipped to another plant for application of the cover in accordance with the present invention.

In the embodiment of FIGS. 1-5, these elongated protuberances 26 extend continuously across an entire dimension of the body support area from marginal portion 24 on one side of the seat member to marginal portion 24 on the other side of the seat member, periodically changing direction along their length. As brought out in FIGS. 2 to 5, the configuration of marginal portion 24 can be changed from that shown in FIG. 1 to that shown in FIGS. 2 to 5. Inspection of FIG. 1 shows that in this embodiment the plurality of elongated protuberances 26, although incorporating curved direction changing portions 27 and portions 28 connecting the direction changing portions 27, nevertheless extend side by side in generally parallel paths between the opposite marginal portions 24 of the seat member. Of course, the general direction of the parallel paths of elongated protuberances 26 could be across other dimensions of the body support area, such as from the front of the seat to the back or diagonally of the seat member without departing from the principles of the invention.

Each elongated protuberance 26 has a bottom wall 30 and sidewalls 31, 32. The upper surface of the sheet of plastic material forming the seat member is formed in contact with the surfaces of the mold as the hot plastic is drawn of forced down into depressions in the mold and this bottom surface in the mold becomes the upper surface in the finished seat member. The surface portions 34 of this top surface of the sheet of plastic material made up of the portions of the sheet which extend between the open tops of protuberances 26 constitute in the aggregate a body engaging structure 33 of the seat and preferably, but not necessarily, this structure is flat to form a comfortable surface for contact with the body of the person using the seat. It is also preferable for comfort in respect to the body engaging structure that the area of plastic sheet between the open tops of the protuberances be as large as possible, consistent with requisite strength in the elongated protuberances and therefore the area of the body engaging structure 33 can, as shown, constitute more than one-half the area of the body support area, which latter area of course includes the open tops of the elongated protuberances. On the other hand at the sacrifice of some comfort aspects, the aggregate area of surfaces 34 may be less than one-half the body support area 23. Of course, surfaces 34 can vary in size and shape in the same body support area 23.

Where desired, due to the nature of the plastic and the fact that it has some memory, the body engaging structure 33 of the seat member can be slightly contoured, concavely upwardly, thereby enhancing the seat-like appearance. The bottom walls 30 of the elongated protuberances are shown flat but can be rounded and in either case the lowermost portions of elongated protuberances 26 can be coplanar and coact in the aggregate to present an overall, generally flat bottom support structure 35 for the member or, if desired, can be slightly contoured as the body engaging structure 33. Where desired, the construction of the die can be such as to have the elongated protuberances gradually increase in depth toward their longitudinal end portions, while their bottom surfaces remain coplanar to give the body engaging structure 33 more contour. Since the departure from a flat structure in respect to body engaging structure 33 of the top of the sheet and corresponding departures from a flat condition in the overall shape of the bottom support structure 35 presented by the bottom walls 30 of the protuberances are not great in any case, the term "generally flat" has been adopted in this specification and in the appended claims to embrace both flat configurations and slight departures from flat configuration for the body engaging structure 33 and the bottom support structure 35.

For example, surface portions 34 can hace some curvature in going from one open elongated protuberance top to the next while to a person seated on the member the structure 35 supporting the person is for support purposes generally flat.

Each elongated protuberance 26 terminates at its ends in a slightly slanting endwall 36 integrally joined to the sidewalls 31, 32 and bottom wall 30 of the elongated protuberance and preferably to the sheet portion entering marginal portion 24. This construction rigidifies the elongated protuberances at their ends.

Figure 9:
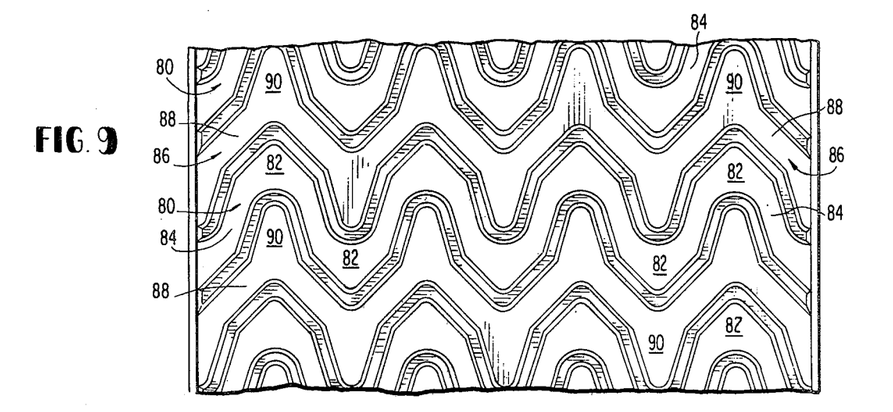
FIG. 9 is a diagrammatic view of another form of elongated protuberances which can be substituted for one of those shown in FIGS. 1 to 8.

It will be evident from an inspection of the preferred form of seat member 20 that the direction changing portions 27 and portions 28 connecting the direction changing portions 27 of adjacent or side by side elongated protuberances generally follow each other along the parallel paths of the protuberances across the seat so as to result in the opposed sides of side by side elongated protuberances being complementary in shape or generally complementary in shape in the plane of body support area 33 and the term complementary as used in this specification and appended claims is intended to embrace a complementary relationship in respect to only the opposed sides of protuberances (see FIG. 15 for a different form of complementary relationship).

It will further be evident that the seat member 20 of the embodiment of FIGS. 1 to 5 and the other modifications can be used along with or without the back member 22, as a seat cushion in any environment, such as on a stadium bench, on the ground in a picnic, beside a swimming pool or in any other environment where the spacing and cushioning effect are desired.

The elongated protuberances 26 with their open tops have a ventilating function because air movement occurs along their length dimension; however, where a greater ventilating action in the seat is desirable, a plurality of ventilating holes 46 are punched through the sheet, preferably in the flat body engaging structure 33, i.e., in the sheet surface portions 34 between the open tops of the elongated protuberances. Ventilating holes can be punched in other places where desired so long as the structural characteristics of the elongated protuberances is not lessened.

The integral hinge 25 preferably has a weakened bend line or "strike" 48 (see FIG. 2) formed across its width adjacent ornamental bead 24 of the seat member so that the hinge will tend to bend readily along this line. Alternatively, bend line 49 can be formed across hinge 25 near the back member 22. Both such bend lines can be used or one or more bend lines anywhere in between. The width of the hinge from side to side is not appreciably greater than the width of the seat member 20 or the back member 22. This is important in that it allows the seat and back members to curve or flex slightly across their width dimension without causing an objectionable flexure in the hinge at right angles to the hinging action.

FIGS. 2 to 6 show how the basic component of FIG. 1 is modified to form the basic component of the present invention. The same reference numerals are used in FIGS. 2 to 6 as are used in FIG. 1 where elements of FIG. 1 are not altered. Where elements of the basic component of FIG. 1 are altered in FIGS. 2 to 6, the same reference numerals are used to indicate the altered elements with the reference numerals in such cases being primed to distinguish from the elements in FIG. 1.

The purpose of modifying the basic component of FIG. 1 to form the basic component of the present invention is to provide a basic component in which the body engaging structure of a seat member and/or a back member is covered by an improved decorative or ornamental cover material which can be reticulated or porous, e.g. a textile material where ventilation is a factor, or an improved padded cover, with or without porosity, where superficial cushioning is desired.

Figures 2, 3, 4, 5, 6:
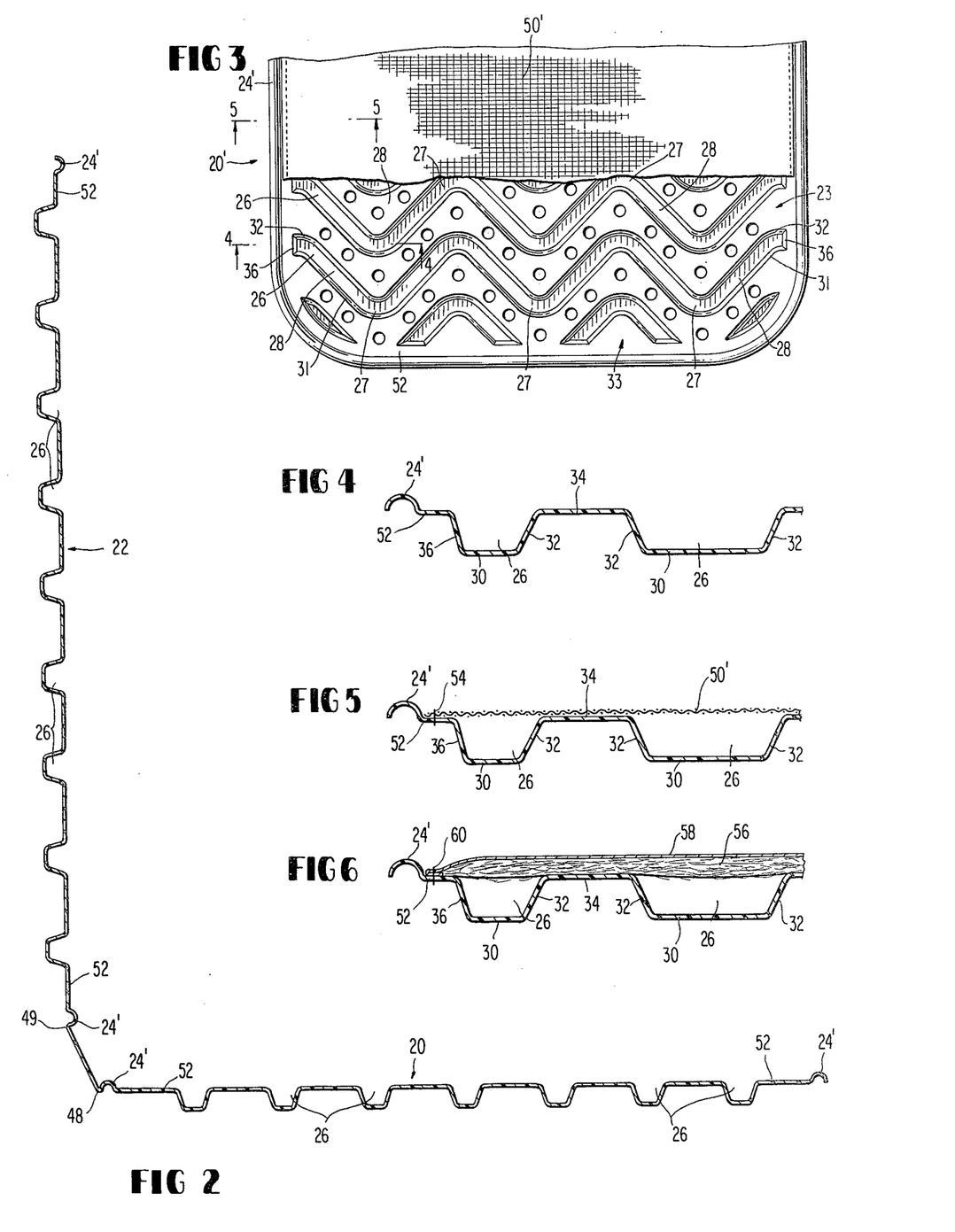
FIG. 2 is a view in vertical section taken on the line 2—2 of FIG. 1 but with portions modified to achieve the improved form of the present invention.
FIG. 3 is an enlarged fragmentary view in plan of a portion of the seat of FIG. 1 modified as indicated in FIG. 2 showing a decorative sheet of material in place in accordance with the present invention.
FIG. 4 is an enlarged view in cross section taken on the line 4—4 of FIG. 3.
FIG. 5 is an enlarged view in cross section taken on the line 5—5 of FIG. 3.
FIG. 6 is a view in cross section similar to FIG. 5 of a modification of the present invention.

Referring now first to FIGS. 2 to 5, marginal portion or bead 24 of FIG. 1 has been modified to form a ledge 52 between bead 24' and the ends of the elongated protuberances 26 by shortening the elongated protuberances (see FIG. 3). Ledge 52 can have a width or depth as small as ¼ or ⅜ths of an inch or this dimension may be greater where needed and the strength of the seat member is not objectionably reduced by loss of reinforcing action of the portion of the elongated protuberance that has been omitted. The purpose of ledge 52 is illustrated in FIGS. 3 and 5 where a sheet of ornamental or decorative cover material 50', which may be reticulated or porous, e.g. a textile material, having dimensions substantially equal to those dimensions of the seat member falling within the bead 24' has its marginal portions resting on ledge 52. One or two lines of sewing 54 attach the cover sheet material to ledge 52. Where preferable an adhesive material may be used instead of sewing. The sheet of cover material 50' will coincide with the body support area and rest on the body engaging structure of the seat member. The edges of the cover sheet material will lie below and be protected by bead 24' all around the seat member. In some cases it is desirable to have the sheet cover material doubled under before sewing or adhering the cover sheet material to ledge 52. In either arrangement the resulting structure is an attractive seat and/or back member.

Referring to FIG. 6, a covered seat member similar to FIG. 5 is shown but with a cushioning pad material 56 extending over the body support area. Such cushioning material can be adhered or sewed to ledge 52 but preferably, as shown in FIG. 6 an ornamental or decorative cover sheet 58 is applied over padding 56 with the cover sheet 58 extending beyond the edges of the padding material and being sewed or adhered to ledge 52 in the same manner as in FIG. 5. This also results in a very attractive seat and back member.

Figure 7:
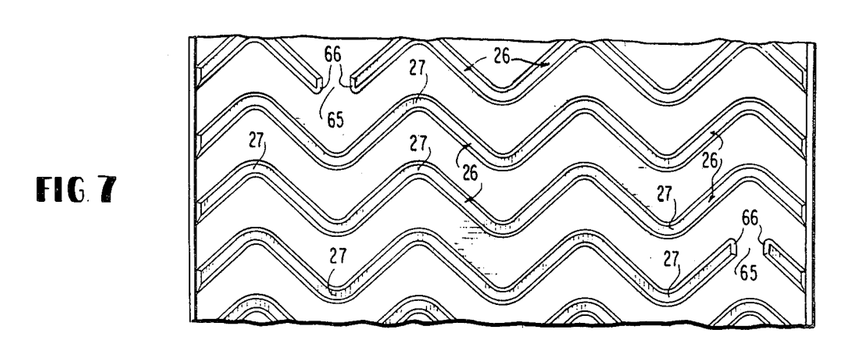
FIG. 7 is a diagrammatic view of a pattern of elongated protuberances which can be substituted for that of FIGS. 1 to 6.

The purpose of FIG. 7 is to illustrate the fact that an occasional elongated protuberance of a component such as component 20 can have the continuity along its length periodically terminated as long as such periodically terminated protuberances are in the minority and each is contiguous to a continuous protuberance so that there is a small loss of sheet stiffening and spring action. In this modification, instead of all the elongated protuberances 26 being continuous from margin to margin of the body support area, an occasional elongated protuberance is made discontinuous by being severed or discontinued at some point or points 65 along its length such as where in contiguous protuberances there is a direction changing portion. At the severance points, the severed elongated protuberances terminate at slightly slanting walls 66 similar to walls 36 closing each end of elongated protuberances 26. In the illustrated embodiment, the severance points 65 in nearest adjacent discontinuous elongated protuberances are disposed in location so that a severance point 65 in one discontinuous elongated protuberance 26 is spaced longitudinally from a severance point 65 in the nearest adjacent discontinuous elongated protuberance. It will be noted that preferably the discontinuous elongated protuberances 26 retain several consecutive direction changing portions 27 between severance points 65 to contribute to sheet stiffening effects and spring action.

FIG. 7 illustrates the fact that all elongated protuberances need not extend entirely across the body support area to attain the advantages of the present invention. Rather, a pattern in which occasional discontinuities in elongated protuberances, which discontinuous elongated protuberances are separated from one another by one or more contiguous continuous elongated protuberances has no substantial adverse effect on the overall sheet stiffening effects and spring action of the body support area. Therefore, in the claims where terminology such as a "a plurality of the elongated protuberances . . . extending longitudinally continuously along paths which extend across an entire dimension of the body support area" occurs the existence of occasional discontinuous elongated protuberances between continuously extending elongated protuberances is not ruled out.

Figure 8:
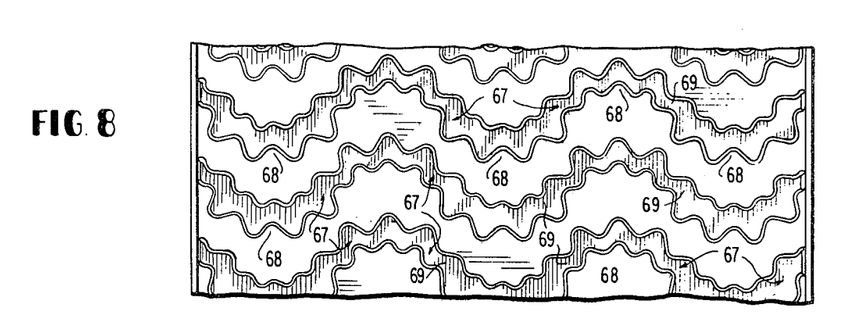
FIG. 8 is a diagrammatic view of another form of elongated protuberances which can be substituted for one of those shown in FIGS. 1 to 7.

The modification of FIG. 8 falls in the category where the elongated protuberances 67 in this modification have a sinuous configuration in the portions 68 extending between the direction changing portions 69 to thereby strengthen the sidewalls of the elongated protuberances. This modification although more difficult to form can be made from a plastic sheet as much as ten percent lighter in gage.

The modification of FIG. 9 discloses elongated protuberances with two types of direction changing portions and two types of portions extending between the direction changing portions, the configurations of the protuberances in this modification being such that the degree of change in direction at alternate succeeding direction changing portions along the length of a protuberance varies in alternating manner. Therefore, pairs of side by side protuberances are complementary in shape and the direction changing portions are overlapping looking in the direction of the length of the protuberances. Applicants' advantages are therefore achieved with this modification.

Referring in more detail to FIG. 9, it will be seen that adjacent elongated protuberances are dissimilar in shape and alternate elongated protuberances are the same shape and each elongated protuberance is symmetrical in respect to a straight line extending along the length of the elongated protuberance equidistant from the direction changing portions. However, the elongated protuberances are so shaped that not only can two of them be paired together with opposed sides complementary but the outer sides of this pair of juxtaposed elongated protuberances will fit in complementary relationship with the outer sides of adjacent pairs on each side of the first pair of juxtaposed elongated protuberances. At the same time, the complementary portions of all the elongated protuberances having overlapping relationship, looking in the direction of the length of the elongated protuberances.

In FIG. 9, each elongated protuberance indicated generally at 80 has less sharply sloping direction changing portions 82 along its intermediate portion and more sharply sloping direction changing portions 84 along its extremities. Juxtaposed elongated protuberances indicated generally at 86 arranged in side by side relationship to elongated protuberance 80 completes one of the pairs just referred to and it will be observed that the opposed sides of the side by side elongated protuberances 80 and 86 are complementary in shape with elongated protuberance 86 having less sharply sloping direction changing portions 88 and more sharply sloping direction changing portions 90, the opposed sides of the more sharply sloping direction changing portions and the less sharply sloping direction changing portions being complementary and the outer sides of the less sharply angled direction changing portions of adjacent pairs of elongated protuberances being complementary. The desired overlapping relationship of the elongated protuberances 80 and 86, forming one pair of elongated protuberances, with adjacent elongated protuberances of adjacent pairs is achieved by virtue of the fact that the less sharply sloping direction changing portions 82 and 88 do have sufficient projection so as to overlap with each other. With these different direction changing sloping characteristics but nevertheless overlapping relationship of direction changing portions, applicants' desideratum of combined resilience and rigidity, together with inherent spring action, are attained.

The protuberance arrangement of FIG. 9 may be considered more aesthetic than those of the earlier described forms and it will be apparent that other aesthetic forms of protuberances incorporating the principles of applicants' invention can be arrived at in similar manner.

Although the elongated protuberances 26 are shown in all modifications except that of FIG. 9 as being serpentine in form with straight connecting portions 28 in between direction changing portions 27, the present invention contemplates the elongated protuberances being made up of widely curved reversed direction portions of sine wave form with the reversed direction portions connected by other portions. However, were the elongated protuberances to be made up of straight portions and sharp angle direction changing portions giving a zigzag configuration, stress would tend to concentrate at the sharp angle points so this configuration is undesirable. It follows that the "change of direction" should be in the nature of a curve.

The principle which is fundamental to the applicants' form of protuberance is that, despite the fact that the body engaging structure 33 can or need not occupy more than one-half the area of the body support area 23, in every case the direction changing portions of the elongated protuberances in the adjacent or side by side protuberances must overlap each other looking in the direction of the length of the elongated protuberances or in other words in the direction of the generally parallel paths the side by side elongated protuberances follow. From this structure follows the advantage that there is no line of weakness in respect to flexure in any direction throughout body support area 23 of seat member 20 or back member 22. This will be made evident by considering the two lines 40, 40 and 42, 42 in FIG. 1 as examples. A plane normal to the plane of body support area 23 containing line 40, 40 or containing any other similar straight line at an angle to the length dimension of the elongated protuberances 26, will pass through a plurality of protuberances 26 and flexure along these lines will be resisted by the traversed portions of the protuberances acting as beams in bending or in torsion.

A plane normal to the plane of the body support area containing line 42, 42, although not passsing through a plurality of protuberances 26 will, because of the direction changing portions 27 and portions 28 connecting direction changing portions of the protuberance involved, pass a plurality of times through portions 28 connecting the direction changing portions of the protuberance and therefore flexure along line 42, 42 will be resisted by the intercepted portions of the protuberance involved. It will further be evident that any plane normal to the plane of the body support area passing through the body support area which is parallel to the line 42, 42 will either meet the same conditions as the plane containing line 42, 42 in respect to a single protuberance or will intersect the direction changing portions of adjacent protuberances because of the overlapping relationship of the direction changing portions of side by side protuberances.

In addition to the foregoing advantages of the overlapping direction changing portions of the elongated protuberances, is an unexpected advantage which arises from this overlapping direction changing characteristic of the elongated protuberances taken with the structural continuity of the direction changing portions with the portions connecting the direction changing portions and the side by side coaction of the elongated protuberances, namely, an inherent spring action present in the body support area 23. This spring action stems from the various portions of the elongated protuberances interacting with adjacent elongated protuberances and contiguous portions of the same elongated protuberance because of the physical properties and inherent resilience of the sheet of plastic material and the fact that the various portions of the elongated protuberances resist longitudinal bending and as a result resiliently twist longitudinally when flexed slightly, some in the same and some in different directions, the open tops of protuberances 26 spreading in one location and narrowing in another. The theory behind this spring action is difficult to describe but the effect is as though a number of coiled tension springs extending in all directions were present in body support area 23. The overall effect is an enhanced cushioning effect for a supported body.

An advantage of the present invention arising from the nestability or stacking feature of the basic components is that an extra strong seat can be achieved by utilizing two nested components held in nested relation in any suitable manner, such as by spot welding the nested components together. In this manner an extra strength seat cushion or component can be formed which is more flexible than a seat cushion or component formed of heavier gage plastic. In addition, to form components from heavier gage plastic slows down a production line to an uneconomic rate of production.

It will be apparent that additional protuberances, even additional elongated protuberances could be present in the device of the present invention without deleteriously affecting the functions of the complementary shaped protuberances.

A manufactured sample seat member will now be described: The body support area measured 17½" in width and 15½" in depth with a ledge 52 measuring ⅜ths of an inch in width. There were eight complete elongated protuberances extending across the entire width of the body support area, each protuberance being ½" wide at the top and about ¼" wide at the bottom with a depth of ½'. The width of sheet extending between the open tops of adjacent protuberances varied between 1½" and ¾". Present in this seat member were ⅛" ventilation holes spaced about 1" apart in the body support surface between protuberances. The direction changing portions changed the direction between portions of each elongated protuberance connecting direction changing portions by about 90° each time. The protuberances were curved in each direction changing portion and the portions joining direction changing portions were straight and measured about 3". Where a back member such as member 22 was involved, the parts were hinged through the medium of an integral hinge formed from the same sheet of plastic material the hinge being about 7" wide and 1¼" long. The plastic material from which the sample was formed was HERCULES No. 7823 polypropylene copolymer and the gage 45 mils. Other plastics can be used and the gage and dimensions of the sample were not critical. The cover material 50 was an open weave paper fiber sheet material.

The above embodiments are to be considered in all respects as illustrative and not restrictive since the invention may be embodied in other specific forms without departing from its spirit or essential characteristics. Therefore, the scope of the invention is indicated by the claims rather than by the foregoing description, and all changes which come within the meaning and range of the equivalents of the claims are intended to be embraced therein.

We claim:

1. A supporting spacing member for use between a supporting surface and a body to be supported comprising a sheet of resilient plastic material having an upper surface and a lower surface, a body support area provided by the sheet of plastic material, the sheet of plastic material including a raised bead surrounding the body support areas, a plurality of spaced elongated protuberances permanently formed in the sheet of plastic material throughout the body support area and extending downwardly from the upper surface, the elongated protuberances being open at the top and having side walls and bottom walls, the plurality of elongated protuberances being disposed in spaced adjacent relation to one another and extending from end to end longitudinally continuously along paths each of which extend across a dimension of the body support area which is slightly less than an entire dimension of the body support area, thereby forming a ledge in the sheet of plastic material extending around the body support area between the raised bead and the ends of the elongated protuberances, portions of the sheet of plastic material which extend between the open tops of spaced adjacent elongated protuberances coating to form in the aggregate a generally flat body engaging structure, the lowermost surfaces of the bottom walls of protuberances coacting to form in the aggregate a generally flat support structure for engaging the supporting surface, each of the plurality of elongated protuberances incorporating along its length a plurality of curved direction changing portions and a plurality of portions connecting the curved direction changing portions, successive curved direction changing portions of elongated protuberances alternating in the direction of change along the paths across the body support area, alternate curved direction changing portions of spaced adjacent elongated protuberances along the paths across the body support area being in overlapping relation to each other looking in the direction the paths extend, the disposition of elongated protuberances in paths across said dimension of the body support area and the overlapping relationship of the alternate curved direction changing portions resulting in a body support area in which all planes normal to the generally flat body engaging structure will successively intersect a plurality of elongated protuberances at a plurality of spaced points across said dimension of the body support area or will repeatedly intersect alternately disposed portions connecting curved direction changing portions of a single elongated protuberance at a plurality of spaced points across said dimension of the body support area.

2. The device of claim 1 including a sheet of decorative material extending across the body support area overlying and covering the generally flat body engaging structure, the margins of the sheet of decorative material overlying the ledge, and means attaching the margins of the sheet of decorative material to the ledge.

3. The device of claim 2 wherein the raised bead has a height above the ledge greater than the thickness of the sheet of decorative material thereby protecting the margins of the sheet of decorative material.

4. The device of claim 2 including a layer of padding material interposed between the generally flat body engaging structure and the sheet of decorative material with the sheet of decorative material restraining the padding material against relative movement.

5. The device of any one of claims 1, 2, 3 or 4 wherein adjacent side walls of spaced adjacent elongated protuberances are complementary in shape along the length dimension of the elongated protuberances.

6. The device of any one of claims 1, 2, 3 or 4 wherein a plurality of the elongated protuberances all have the same shape and each elongated protuberance is spaced from adjacent elongated protuberances the same distance and spaced adjacent elongated protuberances are spaced from each other the same distance throughout their lengths 7. The device of any one of claims 1, 2, 3 or 4 wherein there are openings through the sheet of plastic material in the body engaging structure disposed throughout the body engaging structure.

8. The device of any one of claims 1, 2, 3 or 4 wherein the portions of the elongated protuberances connected to the direction changing portions are straight.

9. The device of any one of claims 1, 2, 3 or 4 wherein the paths of the elongated protuberances across a dimension of the body support area are generally parallel.

10. The device of any one of claims 1, 2, 3 or 4 wherein the spacing between spaced adjacent protuberances is such that the body engaging structure occupies more than one-half the area of the body support area.

11. The device of any one of claims 1, 2, 3 or 4 wherein the physical properties of the sheet of plastic material are such that the plurality of elongated protuberances resist extreme and permanant deformation of the body support area under the weight of the body of a human while resiliently deforming sufficiently to cushion the body.

12. The device of any one of claims 1, 2, 3 or 4 wherein the sheet of plastic material provides a second body support area and an integral connection between the two body support areas acts as a hinge therebetween whereby one body support area can form a seat cushion portion and the other body support area can form a back cushion portion.

* * * * *

UNITED STATES PATENT AND TRADEMARK OFFICE
CERTIFICATE OF CORRECTION

PATENT NO. : 4,328,993

DATED : May 11, 1982

INVENTOR(S) : Helen H. Trotman; Herbert H. Trotman

It is certified that error appears in the above–identified patent and that said Letters Patent are hereby corrected as shown below:

Column 1, line 28, change "of" to --or--.

Column 4, line 29, change "of" to --or--.

Column 5, line 32, change "FIG. 15" to --FIG. 9--;

line 51, change "is" to --are--;

line 59, delete "not";

line 60, delete "greater" and insert --less--.

Column 7, line 18, before "has" insert a comma (,).

Signed and Sealed this

Seventh Day of December 1982

[SEAL]

Attest:

GERALD J. MOSSINGHOFF

Attesting Officer     Commissioner of Patents and Trademarks